United States Patent
Jaeger

(10) Patent No.: US 6,390,741 B1
(45) Date of Patent: May 21, 2002

(54) SAFETY GUARD ASSEMBLY

(76) Inventor: Ben E. Jaeger, 50 Hunter La., Bristol, IL (US) 60512

( * ) Notice: Subject to any disclaimer, the term of this patent is extended or adjusted under 35 U.S.C. 154(b) by 0 days.

(21) Appl. No.: 09/614,235

(22) Filed: Jul. 12, 2000

(51) Int. Cl.[7] .............................................. B23C 9/00
(52) U.S. Cl. ...................... 409/134; 408/241.6; 451/454
(58) Field of Search .................... 409/134; 29/DIG. 56, 29/DIG. 86, DIG. 59, DIG. 94; 408/241.6; 74/608; 144/251 R; 451/454, 272

(56) References Cited

U.S. PATENT DOCUMENTS

| | | | |
|---|---|---|---|
| 4,043,701 A | | 8/1977 | Jaeger |
| 4,062,391 A | * | 12/1977 | Piazzola ............. 408/241.6 X |
| 4,543,021 A | * | 9/1985 | Adler ......................... 409/134 |
| 5,351,403 A | * | 10/1994 | Becker et al. ................ 30/276 |
| 5,525,095 A | * | 6/1996 | Baughman .............. 451/454 X |
| 5,617,987 A | | 4/1997 | Howard et al. |

FOREIGN PATENT DOCUMENTS

FR           2539208      *  7/1984  .............. 408/241.6

* cited by examiner

Primary Examiner—William Briggs
(74) Attorney, Agent, or Firm—Pyle & Piontek

(57) ABSTRACT

A safety guard assembly is adapted to be conveniently moved into position between a work area and an operator station. The safety guard is characterized by a unitary transparent polymer having a planar portion and ribs that impart to the planar portion rigidity against longitudinal bending and transverse flexing. Brackets are attached to opposite sides of the guard and an associated handle and one end of an associated universal support arm are connected to each bracket. The opposite end of each universal support arm is mounted remote from the work area. The handles and universal support arms enable the guard to be quickly and conveniently moved by an operator between positions adjacent to and remote from the work area. When moved between the work area and operator station, the guard restricts, from passage to the work station, chips, broken tools, coolant, etc. as might be ejected from the work area and that could otherwise strike and injure the operator, but otherwise permits the operator to clearly view the work area therethrough.

17 Claims, 4 Drawing Sheets

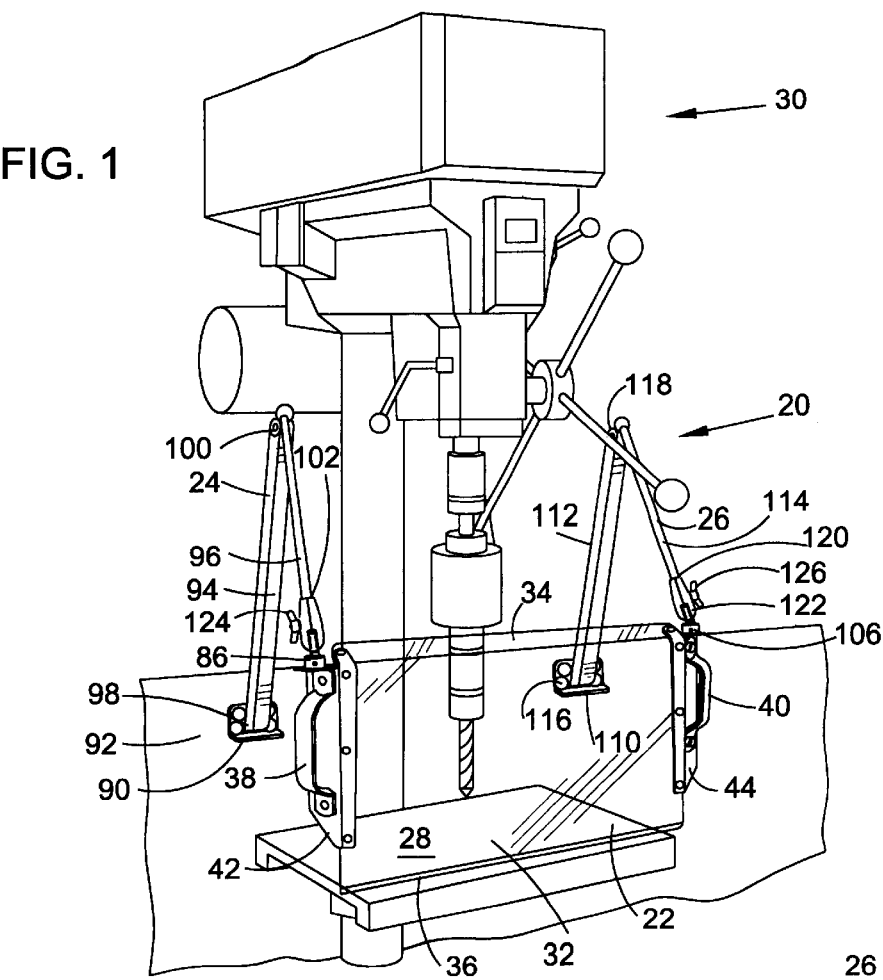
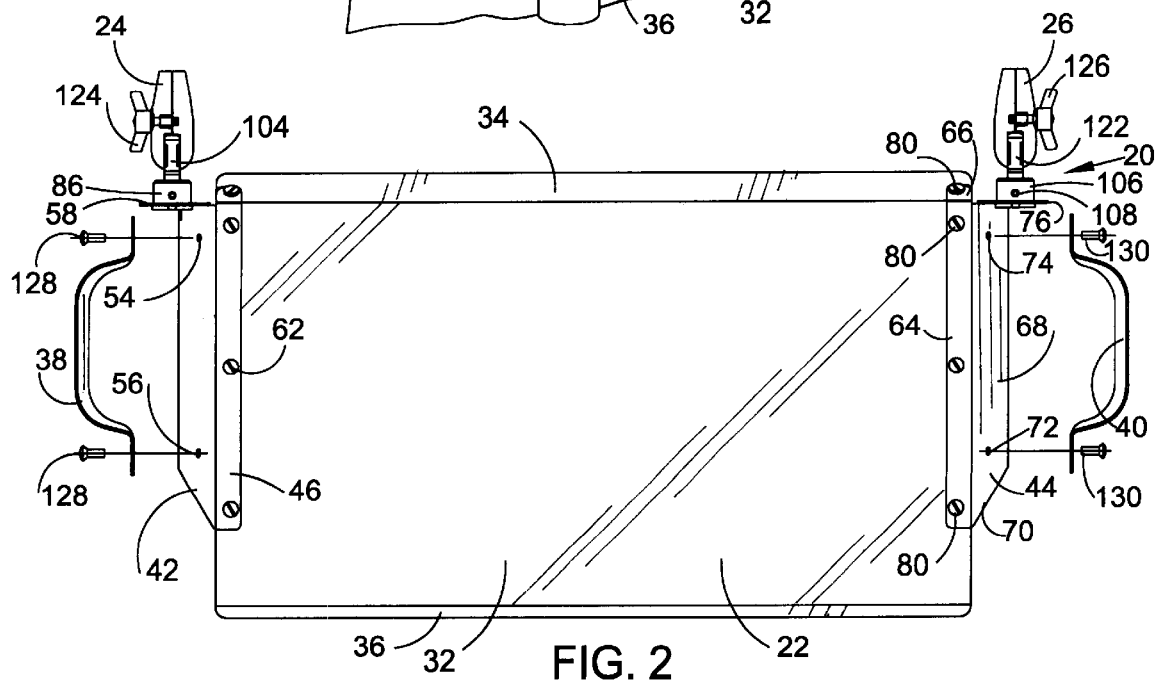

SAFETY GUARD ASSEMBLY

BACKGROUND OF THE INVENTION

The present invention relates to safety guards for use at work areas to deflect materials ejected from the work areas.

In various machining operations, such as grinding, buffing, polishing, drilling, milling, and the like, if often happens that broken tools, coolant etc., are ejected from the work area of a machine and present a hazard to an operator of the machine or other nearby personnel. In an attempt to minimize and hopefully prevent injuries caused by such ejected materials, and for other reasons, the Occupational Health and Safety Act of 1970 was enacted. The Occupational Health and Safety Act requires, in part, that one or more methods of machine guarding be provided to protect the operator and other employees in the area from hazards, such as those created by point of operation, rotating parts, or flying chips.

It is known to provide protection against flying chips and the like by means of a shield extending across the front of a work area. Such shields are generally mounted within or in close proximity to the work area, and present their own set of problems, in that when the shield is moved aside, it often happens that the mount for the shield or the shield itself impedes access to the area. Further, to change a setup for a workpiece, it often is necessary to first reposition the shield mount to be clear of the new setup. Quick change mounts, such as those having magnetic bases, while intended to alleviate the aforementioned problems, scratch and tend to be bumped off the machine mounting surface, sometimes into the work area itself. Thus, protective shields are often inconvenient to use and adjust, which can result in improper or even lack of use of such shields.

An exemplary known machine guard is disclosed by U.S. Pat. No. 4,043,701, issued on Aug. 23, 1977 to Ben E. Jaeger, the present inventor and the teachings of which are specifically incorporated herein by reference. The transparent guard or shield of said patent is well adapted to be positioned between a work area of a machine tool and an operator station to protect the operator and others who may be nearby, and is carried on a universal arm so as to be readily and conveniently moved fully away from the work area to accommodate unimpeded access to the work area and setup. However, a single universal arm carries the transparent shield, so the shield is limited to be of a size and weight as can be properly and securely supported by the arm. Also, the universal arm is anchored to the shield through a handle that is gripped by an operator to move the shield, as a result of which the shield is part of the retention structure for the handle and subject to forces that can damage the shield when the handle is gripped to move the shield assembly. Further, because a single arm supports the shield, undesirable oscillation of the shield on the end of the arm may occur.

OBJECTS OF THE INVENTION

Accordingly, an object of the present invention is to provide an improved guard for a work area of a machine tool, that effectively blocks material ejected from the work area from entering an operator station.

Another object is to provide such a guard, which is easily and readily movable and adjustable between positions adjacent to and remote from the work area.

A further object is to provide such a guard that is easily mountable on various types of machine tools at convenient locations remote from work areas thereof.

A still further object is to provide such a guard that is of a transparent material and configured to effectively extend across the front of the work area of a machine tool.

Still another object is to provide such a guard having a planar portion for undistorted viewing of the work area therethrough.

Yet another object is to provide such a guard that is mounted on a pair of universal arms and that includes a pair of handles to facilitate operator movement thereof between various positions.

SUMMARY OF THE INVENTION

In accordance with the present invention, a safety guard assembly for a machine tool comprises a unitary transparent guard having a generally planar portion and rib means extending along and out of the plane of the planar portion for stiffening the planar portion. Also included is at least one arm having a plurality of movable joints. The at least one arm is coupled at one end to the guard and is mountable at an opposite end remote from a work area of the machine tool. The at least one arm is movable to accommodate supporting the guard at positions in front of the work area with the planar portion of the guard between the work area and an operator station, and at positions remote from the work area. At least one handle is coupled to the guard and grippable by an operator of the machine tool to move the guard on the at least one arm between the positions.

In a preferred embodiment of the invention, the guard planar portion is generally rectangular and the rib means comprises a pair of ribs extending along respective upper and lower ends of the planar portion. The planar portion has a front side and a rear side and the ribs extend outward and rearward away from the planar portion. Also, the at least one arm comprises a pair of arms, each coupled at the one end to the guard and each being mountable at an opposite end remote from the work area. Advantageously, the opposite ends of the pair of arms are mountable remote from and on opposite sides of the work area. In addition, the at least one handle comprises a pair of handles, and the handles and the one ends of the arms are coupled to the guard on respective opposite sides of the guard.

It is contemplated that the movable joints of each arm accommodate pivotal and rotational movement of the one end of the arm with respect to the opposite end of the arm, and included is a pair of brackets connected to respective opposite sides of the guard. The two arms are each connected at the one end thereof to respective ones of the brackets, and the two handles are connected to respective ones of the brackets.

Other objects, advantages and features of the invention will become apparent upon a consideration of the following description thereof, when taken in conjunction with the accompanying drawings.

BRIEF DESCRIPTION OF THE DRAWINGS

FIG. 1 is a perspective view of a transparent safety guard structured in accordance with the teachings of the present invention, mounted on a pair of universal arms for shielding a work area of a machine tool;

FIG. 2 is a front elevation view of the guard and some of the hardware for supporting and moving the guard;

DETAILED DESCRIPTION

Figure 3:
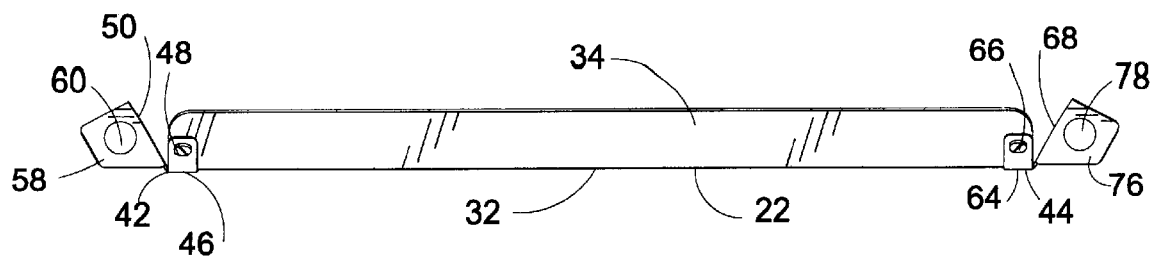
FIG. 3 is a top plan view of the transparent guard, particularly illustrating a planar front thereof for undistorted viewing therethrough.
Figure 4:
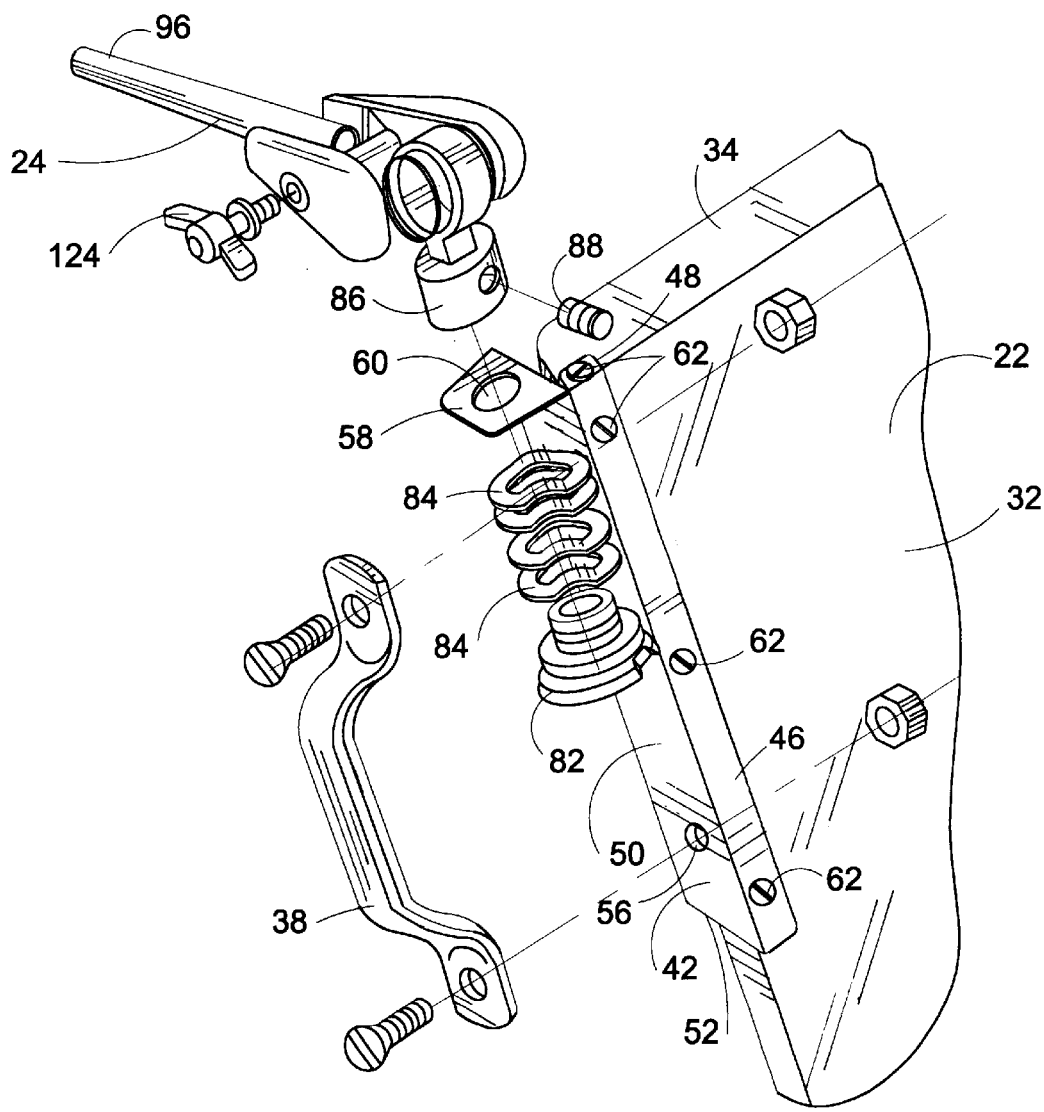
FIG. 4 is a fragmentary, exploded assembly view showing attachment of a bracket, handle and universal arm to one side of the guard.
Figure 5A:
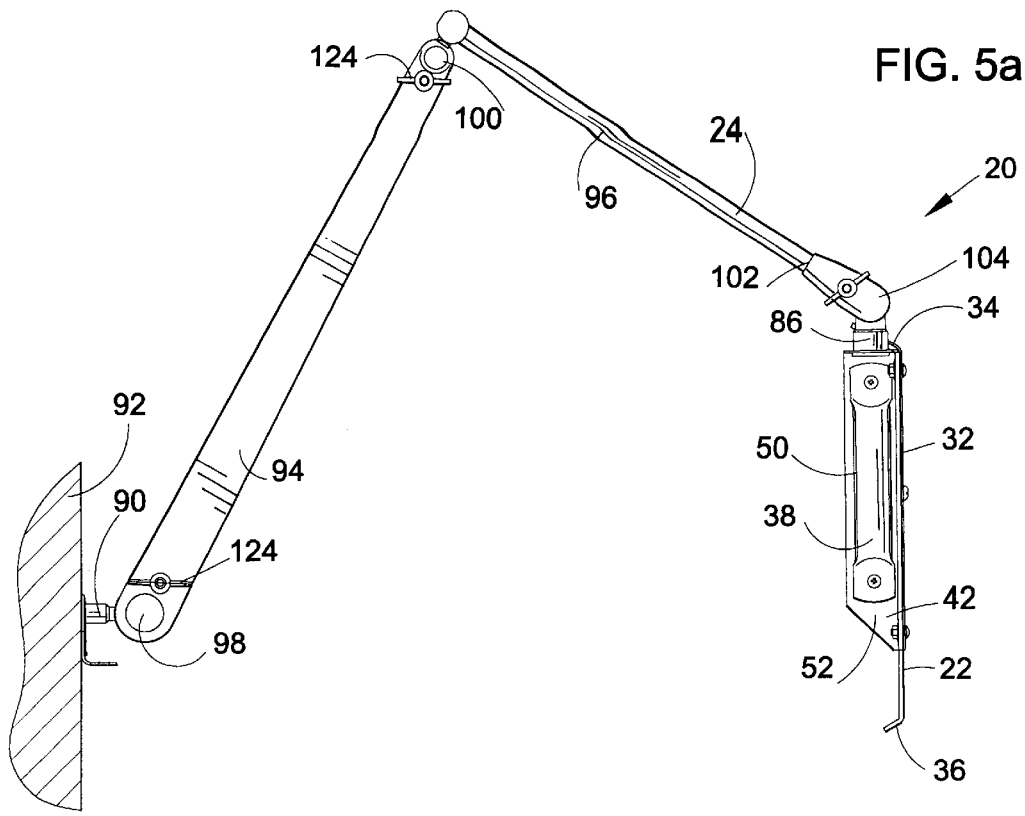
FIGS. 5A and 5B are side elevation views of the guard, showing two of the various positions to which the guard is movable on the arms.
Figure 5B:
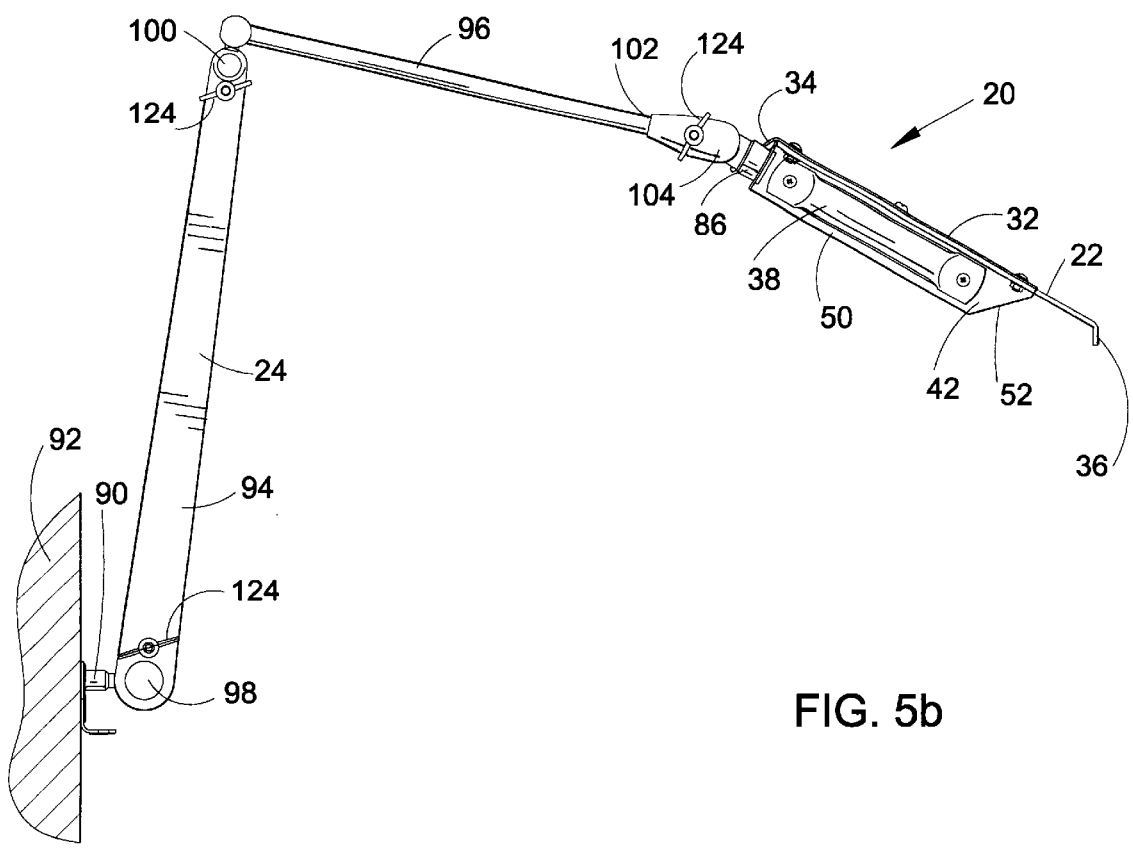
Figure 6:
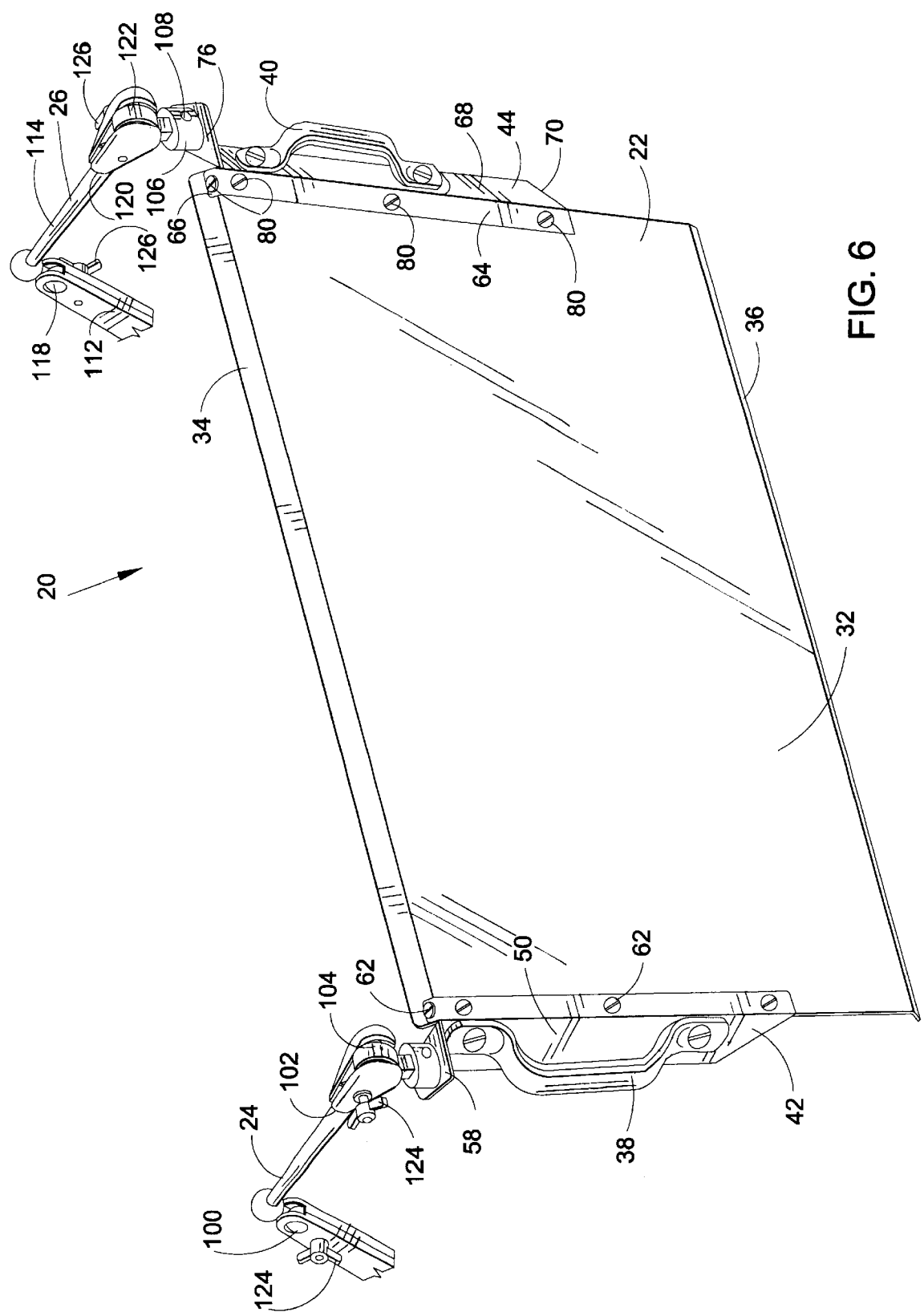
FIG. 6 is a perspective view of the guard assembly.

The invention provides an improved safety guard or shield assembly for work areas, including the work areas of machine tools and the like, which provides an effective barrier that blocks chips and other material that may be ejected from a work area from reaching an operator station, but does not restrict, slow or otherwise interfere with normal machine usage. The safety guard assembly includes a transparent safety guard and a pair of universal support arms that support the guard for movement between positions remote from and in front of the work area to protect an operator of the machine and other nearby personnel. The transparent guard is advantageously integrally made of a polymeric material, such as a polycarbonate material sold by General Electric Company under the trademark Lexan®, which is window-clear, strong and rigid. A major flat or planar portion of the transparent guard allows an undistorted view of workpieces and tools, and the guard advantageously is coated with a mar-resistant finish to provide longer life. Unlike acrylic material that may shatter on impact, the polycarbonate guard is more suitable for use, is virtually shatterproof and provides superior protection for an operator of the machine. Also, unlike acrylic material, the polycarbonate material of the guard is resistant to most coolants and normally does not discolor.

Referring to the drawings, the safety guard assembly of the present invention is indicated generally at 20 and includes a guard 22 made from a transparent polycarbonate material and carried on opposite sides by a pair of universal or jointed support arms 24 and 26. The guard 22 is movable on the arms to various positions adjacent to and across the front of a work area 28, which may be the work area of a cutting, milling, abrading, or other machine tool, such as a drill press shown generally at 30. When positioned across the front of the work area, the guard blocks passage to a machine operator of chips, broken tools, coolant, etc. as might be ejected at high speed from the work area during a machining operation. In this manner, the guard affords protection to the machine operator and to other nearby personnel. While not shown, another guard, which need not be of the same type as the guard 22, may be positioned behind and perhaps on opposite sides of the work area.

As mentioned, the guard 22 is of an integral and transparent polymeric material, preferably polycarbonate, that is highly transparent to allow clear viewing of the work area 28, yet is sufficiently shatterproof and durable to resist damage and shattering upon being impacted by ejected material. The guard may have a generally rectangular and planar or flat major front portion 32 and a pair of ribs 34 and 36 at upper and lower ends of the front portion. The ribs extend coextensively with and rearward and outward a small distance out of the plane of the front portion. The ribs primarily serve to impart rigidity to the guard to prevent longitudinal bending and transverse flexing, but they also act to deflect material ejected from the work area.

The universal support arms 24 and 26 carry the transparent guard 22. One side of the guard is connected to one end of the universal arm 24 and the other side of the guard is connected to one end of the universal arm 26, with opposite ends of the arms being mounted to either the machine 30 or another suitable support As compared to the safety shield of said U.S. Pat. No. 4,043,701, which by virtue of being carried by a single arm may necessarily be smaller and/or lighter than desired and somewhat "floppy" on the single arm, the guard 22 is securely carried on each of its sides by a pair of arms. Because the guard 22 is carried by a pair of arms instead of a single arm, it can advantageously be larger and/or heavier, it can be made to be more rigid, it is not as susceptible to oscillation, and it is generally more stable. At the same time, by virtue of the manner in which the arms may be attached to the machine or other support, they do not significantly interfere with use of the machine or the actions of the machine operator.

To attach respective ones of the arms 24 and 26, and respective ones of a pair of handles 38 and 40, to opposite sides of the guard 22, brackets 42 and 44 are connected to opposite sides of the guard. The bracket 42 is integrally formed and includes a front part 46 that overlies one side edge of the guard front portion 32. An upper end 48 of the bracket front part 46 extends rearwardly and upwardly out of the plane of the front part at the same angle as the rib 34 of the guard extends out of the plane of the front portion 32, and overlies the rib. A side wall 50 of the bracket extends outwardly and rearwardly from the bracket front part, and a lower end 52 of the side wall is tapered upwardly and rearwardly. Handle mounting passages 54 and 56 extend through the side wall, and an arm mounting flange 58 extends outward from the upper end of the side wall. A passage 60 through the flange accommodates connection of an outer end of the universal arm 24 to the flange and bracket 42. The bracket is attached to the guard by a plurality of fasteners 62 extending between the bracket front part 46 and the front portion 32 of the guard and between the bracket front part upper end 48 and the rib 34 of the guard. Use of a plurality of fasteners spaced along the front portion and rib of the guard distributes stresses and reduces bending and cracking of the guard.

The bracket 44 is a mirror image of the bracket 42 and a similar description applies. The bracket 44 has a front part 64, an upper end 66 of the front part, a side wall 68 and a taper 70 at the bottom of the side wall. The side wall 68 has handle mounting passages 72 and 74, a flange 76 at its upper end and a passage 78 formed through the flange. A plurality of fasteners 80 attach the bracket 44 to the guard.

The universal support arm 24 is rotatably secured at one of its ends to the bracket 42. This is accomplished by extending a threaded nipple 82 through a plurality of spring washers 84 and the passage 60 in the flange 58 into threaded engagement with a swivel 86 at the one end of the arm, and a set screw 88 is then tightened to lock the nipple in the swivel. An opposite end of the arm may be mounted, as by a bracket 90, to one side of the machine 30 or, as shown, to some other suitable surface or support 92 to the side of the work area 28. The arm is comprised of a pair of arm sections 94 and 96 that are joined together and to the brackets 42 and 90 by a plurality of flexible knees or joints 98, 100, 102 and 104 that allow rotational and pivotal movement of the arm sections, both with respect to each other and with respect to the brackets 42 and 90.

The universal support arm 26 is, in turn, rotatably secured at one of its ends to the bracket 44. This is accomplished by extending a threaded nipple (not shown) through a plurality of spring washers (not shown) and the passage 78 in the flange 76 into threaded engagement with a swivel 106 at the one end of the arm 26, and a set screw 108 is then tightened to lock the nipple in the swivel. An opposite end of the arm may be mounted, as by a bracket 110, to one side of the machine 30 or, as shown, to some other suitable surface or the fixture 92 to the side of the work area 28. The arm 26 is comprised of a pair of arm sections 112 and 114 that are joined together and to the brackets 44 and 110 by a plurality of flexible knees or joints 116, 118, 120 and 122 that allow rotational and pivotal movement of the arm sections both with respect to each other and with respect to the brackets 44 and 110.

The jointed arms 24 and 26, by virtue of their rotatable connection to the brackets 42 and 44, and through the brackets to the guard 22, support and allow movement of the guard between operator protecting positions adjacent to and in front of the work area 28 and various positions remote from the work area. Preferably, the resistance of the arm joints to movement is selectively adjustable, as by thumbscrews 124 of the arm 24 and thumbscrews 126 of the arm 26, to provide a desired degree of support to the guard or to accommodate guards of various sizes and weights.

For convenience in moving the guard to various positions, the operator gripping handles 38 and 40 are attached to the brackets 42 and 44. The handle 38 is attached to the bracket 42 by means of a pair of fasteners 128 extending through the handle and the handle mounting passages 54 and 56. The handle 40 is attached to the bracket 44 by means of a pair of fasteners 130 extending through the handle and the handle mounting passages 72 and 74.

During a machining operation, when the guard is positioned between the work area 28 and the operator station, the transparent and planar major front portion of the guard permits the operator a clear and unobstructed view of the work area. Then, at the end of the machining operation or when operator access to the work area is otherwise required, the guard can readily be moved on the arms to a position away from the work area to allow unimpeded access to the work area.

The guard assembly is adapted to be used with a wide variety of machines. The universally jointed arms allow the guard to be employed in a horizontal, vertical or angular position, as may be required for different machines. The adjustable arms also allow the guard to be moved very close to the working portion of the machine, which then allows the operator to more closely inspect the work while the guard provides protection for his face and eyes. In addition, for convenience in mounting the guard assembly, the arm mounting brackets 90 and 110 can easily be affixed to opposite sides of the machine or to another suitable surface on opposite sides of the machine.

While one embodiment of the invention has been described in detail, various modifications and other embodiments thereof may be devised by one skilled in the art without departing from the spirit and the scope of the invention, as defined by the appended claims.

What is claimed is:

1. A safety guard assembly for a work area, comprising a unitary transparent guard having a generally rectangular planar portion with upper and lower ends, side ends and at least one rib means extending along at least one of said upper and lower ends and out of the plane of said planar portion for stiffening said planar portion; at least one bracket means connected to said guard planar portion along at least one of said planar portion side ends; at least one arm having a plurality of movable joints, said at least one arm being connected at one end to said at least one bracket means and being mountable at an opposite end to a support, said at least one arm being movable to accommodate supporting said guard at positions where said guard planar portion is between the work area and an operator station, and at other positions; and at least one handle coupled to said at least one bracket means and grippable by an operator to move said guard on said at least one arm between said positions.

2. A safety guard assembly as in claim 1, wherein said at least one rib means comprises a pair of rib means extending along respective upper and lower ends of said planar portion.

3. A safety guard assembly as in claim 2, wherein said guard planar portion has a front and a rear and said ribs extend outward and rearward from said guard planar portion.

4. A safety guard assembly as in claim 1, wherein said at least one bracket means comprises a pair of bracket means each connected to said guard planar portion along a respective one of said planar portion side ends, and said at least one arm comprises a pair of arms each connected at said one end to a respective one of said bracket means and each arm being mountable at an opposite end to the support.

5. A safety guard assembly as in claim 4, wherein said opposite ends of said pair of arms are mountable to the support remote from and on opposite sides of the work area.

6. A safety guard assembly as in claim 1, wherein said at least one bracket means comprises a pair of bracket means and said at least one handle comprises a pair of handles each connected to a respective one of said bracket means.

7. A safety guard assembly as in claim 4, wherein said at least one handle comprises a pair of handles each connected to a respective one of said bracket means on opposite sides of said guard planar portion.

8. A safety guard assembly as in claim 4, wherein said movable joints of said arms accommodate pivotal and rotational movement of said guard.

9. A safety guard assembly as in claim 4, wherein said at least one rib means has side ends each extending generally coextensively with a respective one of said planar portion side ends and said at least one bracket means is connected to said guard along said coextensive side ends of said at least one of said rib means and planar portion, said at least one arm being connected at said one end thereof to said at least one bracket remote from the connection of said at least one bracket to said guard.

10. A safety guard assembly as in claim 9, wherein said at least one handle is connected to said at least one bracket remote from the connection of said at least one bracket to said guard.

11. A safety guard assembly for a work area, comprising a unitary transparent guard having a generally rectangular planar portion with upper and lower ends, side ends and at least one rib means extending along at least one of said upper and lower ends and out of the plane of said planar portion for stiffening said planar portion; a pair of bracket means connected to said guard planar portion along respective side ends thereof; a pair of arms each having a plurality of movable joints and each being connected at one end thereof to a respective one of said bracket means remote from the connection of said bracket means to said guard and each arm being mountable at an opposite end to a support, said arms being movable to accommodate supporting said guard at positions where said guard planar portion is between the work area and an operator station, and at other positions; and a pair of handles each coupled to a respective one of said bracket means remote from the connection of said bracket means to said guard and grippable by an operator to move said guard on said arms between said positions.

12. A safety guard assembly as in claim 11, wherein said bracket means are rotatably secured to said one end of each of said arms.

13. A safety guard assembly as in claim 11, wherein said guard is made of polycarbonate.

14. A safety guard assembly as in claim 11, wherein said guard planar portion has a front and a rear and said ribs extend outward and rearward from said guard planar portion.

15. A safety guard assembly as in claim 11, wherein at least one of said rib means has side ends extending generally coextensively with said guard planar portion side ends and said pair of brackets are connected to said guard along respective coextensive side ends of said at least one rib means and said planar portion.

16. A safety guard assembly as in claim 11, wherein each said arm includes joint adjusting means for controlling the resistance to movement of said joints.

17. A safety guard assembly as in claim 11, wherein said guard is made of a transparent plastic.

* * * * *